(12) United States Patent
Maurer et al.

(10) Patent No.: US 7,211,958 B2
(45) Date of Patent: May 1, 2007

(54) MODULATION OF A BACKGROUND LIGHT OR ANY ILLUMINATION OF A MOBILE PHONE

(75) Inventors: Michael Maurer, Waiblingen (DE); Andreas Adler, Schlierbach (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 351 days.

(21) Appl. No.: 10/929,654

(22) Filed: Aug. 30, 2004

(65) Prior Publication Data

US 2006/0038498 A1 Feb. 23, 2006

(30) Foreign Application Priority Data

Aug. 17, 2004 (EP) ................... 04368060

(51) Int. Cl.
H05B 37/00 (2006.01)
(52) U.S. Cl. .................. 315/123; 315/294; 348/608
(58) Field of Classification Search ............. 315/123, 315/291, 294, 312; 348/607, 608; 455/265
See application file for complete search history.

(56) References Cited

U.S. PATENT DOCUMENTS

| 1,749,011 | A | 3/1930 | Wilfred |
| 3,869,699 | A | 3/1975 | Haller et al. ............. 340/148 |
| 4,176,581 | A | 12/1979 | Stuyvenberg ............. 84/464 R |
| 4,771,280 | A | 9/1988 | Molinaro ............. 340/815.11 |
| 4,928,568 | A | 5/1990 | Snavely ................ 84/464 R |
| 5,056,399 | A | 10/1991 | Hornstein ............. 84/464 R |
| 5,461,188 | A | 10/1995 | Drago et al. ............. 84/600 |
| 5,784,096 | A | 7/1998 | Paist ...................... 348/32 |
| 6,046,724 | A | 4/2000 | Hvass ..................... 345/150 |

(Continued)

FOREIGN PATENT DOCUMENTS

EP 1109380 A 6/2001

(Continued)

OTHER PUBLICATIONS

Motorola, Inc., Schaumberg, IL., Markets a cellular telephone (Model V600) found on http://commerce.motorola.com/cgi-bin/ncommerce 3/ProductDisplay, no date available.

(Continued)

Primary Examiner—Tuyet Vo
Assistant Examiner—Jimmy Vu
(74) Attorney, Agent, or Firm—Saile Ackerman LLC; Stephen B. Ackerman; Billy Knowles

(57) ABSTRACT

A communication device such as a cellular or wireless telephone handset has a light display, such as handset cover light or display backlight, synchronized to audio signals from multiple audio sources such as a microphone or AM/FM receiver. The communication device further includes an audio to illumination conversion apparatus for modulating the light display in response to the audio signal. The audio to illumination conversion apparatus has a plurality of audio filter circuits for filtering the audio signal to restrict frequency content of the audio signal to a pass-band. Multiple integration circuits generate an energy content signal indicating an energy level within the pass-band and for the whole spectrum of the audio signal. An illumination modulator generates a modulation pattern for the light display in response to the energy content signals from a predefined light show.

73 Claims, 5 Drawing Sheets

U.S. PATENT DOCUMENTS

| | | | |
|---|---|---|---|
| 6,232,937 B1 | 5/2001 | Jacobsen et al. | 345/87 |
| 6,400,393 B1 * | 6/2002 | Limberg | 348/21 |
| 6,433,835 B1 * | 8/2002 | Hartson et al. | 348/608 |
| 6,720,863 B2 | 4/2004 | Hull et al. | 340/7.51 |
| 6,725,463 B1 * | 4/2004 | Birleson | 725/151 |
| 6,746,131 B1 | 6/2004 | Goldstein et al. | 362/96 |
| 2001/0050756 A1 | 12/2001 | Lipton et al. | 353/15 |
| 2002/0154787 A1 | 10/2002 | Rice et al. | 381/124 |

FOREIGN PATENT DOCUMENTS

| | | |
|---|---|---|
| WO | WO 03/075548 A | 9/2003 |
| WO | WO 03/077505 A | 9/2003 |

OTHER PUBLICATIONS

"PIC_Hi-Tech_C_Mike_Pearces_disco_light_controller," Found Jun. 9, 2004 at www.microchipc.com/sourcecode.

Electronic Kits and Tools, Apogee Kits, found on file://c:\DocumE~1\BILL~1.HPD\LOCALS~1\Temp\TYVVQS1.htm, no date available.

The Encyclopedia of Electronic Circuits, Grat, TAB Books, Inc., Blue Ridge Summit, PA, 1985.

* cited by examiner

MODULATION OF A BACKGROUND LIGHT OR ANY ILLUMINATION OF A MOBILE PHONE

BACKGROUND OF THE INVENTION

1. Field of the Invention

This invention relates generally to illumination devices. More particularly, this invention relates to illumination devices on communication devices such as wireless or cellular phones or personal digital assistants. Even more particularly this invention relates to illumination devices on communication devices in which color, brightness, and illumination pattern is responsive to an audio signal.

2. Description of Related Art

Color organs or light organs are well known in the art. During the 1960's and 1970's, the term color organ referred to devices that converted sound to images which were synchronized with sound, particularly the audio generated during the musical performances. These devices usually had electronic filters that created frequency bands of the sound of the music. The frequency bands were coupled to colored lights whose brightness was dependent upon the amplitude and period of the particular frequencies of the frequency band.

U.S. Pat. No. 1,749,011 (Wilfred) provides a moving color projection, was a kind of light sculpture. The device was termed a "clavilux" and this term has become associated with the presentations created for light or color organs.

Motorola, Inc., Schaumberg, Ill. Markets a cellular telephone (Model V600) that provides a feature referred to as Situational Lights. The cover light on a V600 cellular telephone glows with every call. The color of the cover light and pattern are programmable to match ring tone or according to a Java programming script.

"PIC_Hi-Tech_C_Mike_Pearces_disco_light_controller," Found Jun. 9, 2004 at www.microchipc.com/sourcecode, contains schematics for a "color organ" that receives an audio signal, filters the signal and with a program running in a microcontroller modulates lights according to the audio signals.

Multiple color organ electronic kits are available from manufacturers and distributors such as Apogee Kits of Frisco, Tex. These kits, when assembled, provide electronic circuits that modulate lights according to an input audio signal.

The Encyclopedia of Electronic Circuits, Graf, TAB Books, Inc, Blue Ridge Summit, Pa., 1985 provides schematics of circuits for a sound modulated light source and an audio controlled lamp. Each circuit receives an audio signal and modulates a light based on the amplitude of the signal.

U.S. Pat. No. 4,176,581 (Stuyvenberg) describes an audio amplitude-responsive lighting display varying the intensity of a plurality of lights in accordance with plural channel audio amplitude signals. The lights are responsive to separate channels of audio amplitude signals, with each bank of lights being responsive to the amplitude of the associated channel of audio amplitude signals U.S. Pat. No. 4,771,280 (Molinaro) teaches an acoustical visual sound device used for the visual interpretation of a received acoustical or electrical sound signal. The device has a filter for passing the intelligence contained within a band of frequencies of a received sound signal. A multistage amplifier amplifies the passed intelligence to a sufficient power level to operate an electro visual means connected at the output thereof throughout its operable visual variable range.

U.S. Pat. No. 5,056,399 (Hornstein) provides an audio display module and audio responsive circuit. The display module includes a plurality of light sources mounted in an enclosure. The audio responsive circuit is connected in circuit with the light sources. The circuit includes means for providing an electrical signal representative of an audio signal. Additionally, the circuit includes at least a first and second counter for driving the light sources in response to the electrical signal. Each of the counters has first and second inputs responsive to a positive and a negative edge, respectively, of the electrical signal to initiate the operation of the counter. The circuit also includes circuits for altering which of the first and second counters responds to the positive or negative edges of the electrical signal.

U.S. Pat. No. 5,461,188 (Drago, et al.) describes a synthesized music, sound and light system that is incorporated into articles of clothing, such as a pair of shoes. The system when activated, allows a multiplicity of lights to illuminate in synchrony with the rhythmic beat of either an internal or an external music or sound program that is heard through an audio transducer. When the system is incorporated into a pair of shoes, a person can perform a dance routine or other form of expression in compliment with the selected music and light program. To enhance the utility of the invention, the system includes three user operated controls: a music program select switch that allows the selection of musical light programs, a control that allows the speed of the lights and rhythmic beat of the selected program to be increased or decreased, and a control that allows setting the volume of the sound.

U.S. Pat. No. 5,784,096 (Paist) teaches a dual audio signal derived color display that displays two-channel audio input signals in a three-color visual pattern. In general, the visual pattern may be formed on a viewing screen by an apparently moving spot having three color components. Phase shifting means are employed to phase shift one of the two audio input signals, and both audio input signals are subsequently processed by low pass filters to produce positioning signals in X-Y coordinates for the spot which forms the visual pattern. In addition, the two audio input signals are also mixed and separately processed by a high pass filter, a band-pass filter and a low pass filter to produce frequency separated signals for controlling the intensity of each of three color components of the spot forming the visual pattern. Automatic color balance means utilizing negative feedback is employed to control the amplitude of the separate frequency-discriminated audio signals. Preferably, the display unit employs a color cathode ray tube and may comprise equipment of the type normally found in video games or in a color television receiver altered to accept X-Y position and color information. This display permits the simultaneously presentation of a plurality of colors which correspond to audio input.

U.S. Pat. No. 6,046,724 (Hvass) illustrates a method and apparatus for the conversion of sound waves to light. The sound waves are converted to an electrical signal and processed by a number of filters, the distribution between the filters being a result of the frequency of the sound wave and in which the filters are subsequently connected to their respective color display and where the individual color display's activation is directly proportional to their filter's amount of signal processing and where the color display visualization in a display means is in the form of a single color or a mixture of two or more color displays.

U.S. Pat. No. 6,232,937 (Jacobsen, et al.) details a microdisplay system that utilizes a small high resolution active matrix liquid crystal display with an illumination system and a magnifying optical system to provide a hand held communication display device. The system has an alternating common voltage which allows reduced power consumption. In addition an internal heating system in the display allows the system to be used at low temperatures. The system can employ an LED illumination system and cellular communication or processor circuits within a compact housing to provide communication devices such as pagers, telephones, televisions, and hand held computer or card reader devices with a compact high resolution data and/or video display.

U.S. Pat. No. 6,720,863 (Hull, et al.) describes a mobile electronic communication device includes a processor unit, a transceiver, a keypad and a light unit. Each key of the keypad is associated with a contact of a contact list. The light unit can perform light functions to notify a user of the reception and/or status of messages received via the transceiver. The light functions include providing an indication of the age of a received message that was sent by a contact in the contacts list. The age of the message is indicated by a modulation of the illuminating light. The age of a message may be indicated as one of a set of predetermined age ranges, with each age range being represented by a unique color.

U.S. patent application 20020154787 (Rice, et al.) illustrates a modular light dancer controller for use with holiday and other lighting displays is used to create dynamic, interesting multi-colored lighting displays in response to sound.

U.S. patent application 20010050756 (Lipton, et al.) teaches a color organ is realized through software programming. Audio signals are input to a microprocessor-based controller. The controller then correlates an object to each audio signal on the basis of selected waveform characteristics. The object is then rendered for display on an electronic display. The display may be auto-stereoscopic, or it may be viewed through a stereoscopic selection device.

SUMMARY OF THE INVENTION

An object of this invention is to provide a communication device such as a cellular or wireless telephone handset or a personal digital assistant having a light display synchronized to sound.

Another object of this invention is to provide a communication device having a light display such as a cover light, a backlight for a matrix display, or the light generated upon the matrix display that is synchronized to sound.

Further, another object of this invention is to provide a communication device having input ports where the sound is converted to audio signals for synchronizing the light display.

To accomplish at least one of these objects, a communication device such as a cellular telephone handset, a cordless telephone handset, or a personal digital assistant capable of communicating with a telephone network, includes a an illumination device for providing lighting for the communication device and at least one audio input source. Each audio input source receives a sound and converts the sound to the audio signal. The communication device further includes an audio to illumination conversion apparatus for modulating the illumination device in response to an audio signal. The audio to illumination conversion apparatus has a plurality of audio filter circuits, in which each audio filter circuit is in communication with the audio input sources to receive the audio signal. Each audio filter circuit then filters the audio signal to restrict frequency content of the audio signal to a pass-band of each of the plurality of the audio filter circuits. The audio to illumination conversion apparatus has a plurality of integration circuits. Each integration circuit is in communication with one of the plurality of audio filter circuits to generate an energy content signal indicating a first energy level within the pass-band of the audio signal. An illumination modulator is in communication with the plurality of integration circuits to generate a modulation pattern for the illumination device in response to the energy content signals of the plurality of integration circuits.

The audio to illumination conversion apparatus further has a short term integration circuit and a long term integration circuit. The short term integration circuit is in communication with the plurality of audio input sources to generate a short term energy content signal indicating a second energy level of the audio signal over a whole spectrum of the audio signal. The long term integration circuit is in communication with the plurality of audio input sources to generate a long term energy content signal indicating a mean loudness of the audio signal over a whole spectrum of the audio signal. The short term and long term integration circuits further assist in the generation of the modulation pattern for the illumination device in response to the short term and long term energy content signals. A relationship of the short term energy content signal and the long term energy content signal ensure that sound signals with low energy content provide modulate the illumination device with acceptable light variations.

The audio to illumination conversion apparatus further includes an illumination device control circuit in communication with the illumination modulator to receive the modulation pattern to generate illumination device control signals to control color and brightness of the illumination device. The illumination device may be a plurality of light-emitting diodes, a liquid crystal display backlight, an incandescent light, a fluorescent light, an electroluminescent light, or a matrix image display element. The matrix image display element includes displays such as a cathode ray tube, a liquid crystal display, or plasma display.

The audio sources are chosen from a group of audio sources such as a microphone, an RF receiver, or a digital audio source. Further, the audio source may be a sound database containing communication ring tones or recorded sound files. If the audio signals from the audio sources are analog signals, the audio source includes an analog to digital converter to sample electrical signals generated by a transducer receiving the sound and convert the sample to a digital coding representing the sample of the electrical signals.

DETAILED DESCRIPTION OF THE INVENTION

Present day cellular telephones have a number of features included in the handset such as telephone books or programmable ring tones that allow a user to have a unique ring when a call is received. As described above, Motorola, Inc. has a cellular telephone with a cover light that provides "Situational Lights" that are associated with a caller identification.

A communication device of this invention such as a cellular or wireless telephone or a personal digital assistant has circuits or a processor to execute program processes included that provide an audio to illumination conversion. These circuits or program processes receive an audio signal from one of multiple sources. These sources may include a built in microphone of the communication device, an AM/FM radio receiver, a digital audio source such as a satellite radio or MP3 file, or recorded sound files used for ring tones of the cellular phone. The audio source is assigned to a dedicated lightshow in one of the system menus during the programming of the communication device.

If the any of the sources of the audio signal are analog audio signals such as from the microphone or from an AM/FM radio receiver, the input to the communication device includes an analog to digital converter to sample the audio signal and create a digital audio signal. The digital audio signal, whether from an external digital source (i.e. the MP3 files) or the digitized analog audio source, is then applied to a multiple filters that are used to divide the spectrum of the audio signal into pass band intervals. Each pass band is then integrated to determine the energy content of the pass bands of the filter signal. An energy content signal contains the value of the energy content of the pass band.

The energy content signal is then passed to an illumination modulator. The illumination modulator determines the color, brightness, duration, and timing of illumination devices within the communication device or connected to it. The illumination modulator is connected to a light show database that contains the instructions for the color, brightness, duration, and timing of illumination devices. The appropriate light show is chosen during the programming of the communication device, as is the illumination device used to display the light show.

The illumination device is selected from the illumination devices incorporated in the communication device such as the cover light as describe above, a backlight of a liquid crystal display, or even the display itself (liquid crystal, plasma, cathode ray tub, or other similar matrix displays).

The light shows retained in the light show database may be a fixed set of algorithms with programmable parameters. Alternately, the light show may be customized employing programming languages such as Java. In the case of light-show customization, it can be done by the user or via downloads from service providers (comparable to the ring tone downloads).

Figure 1:
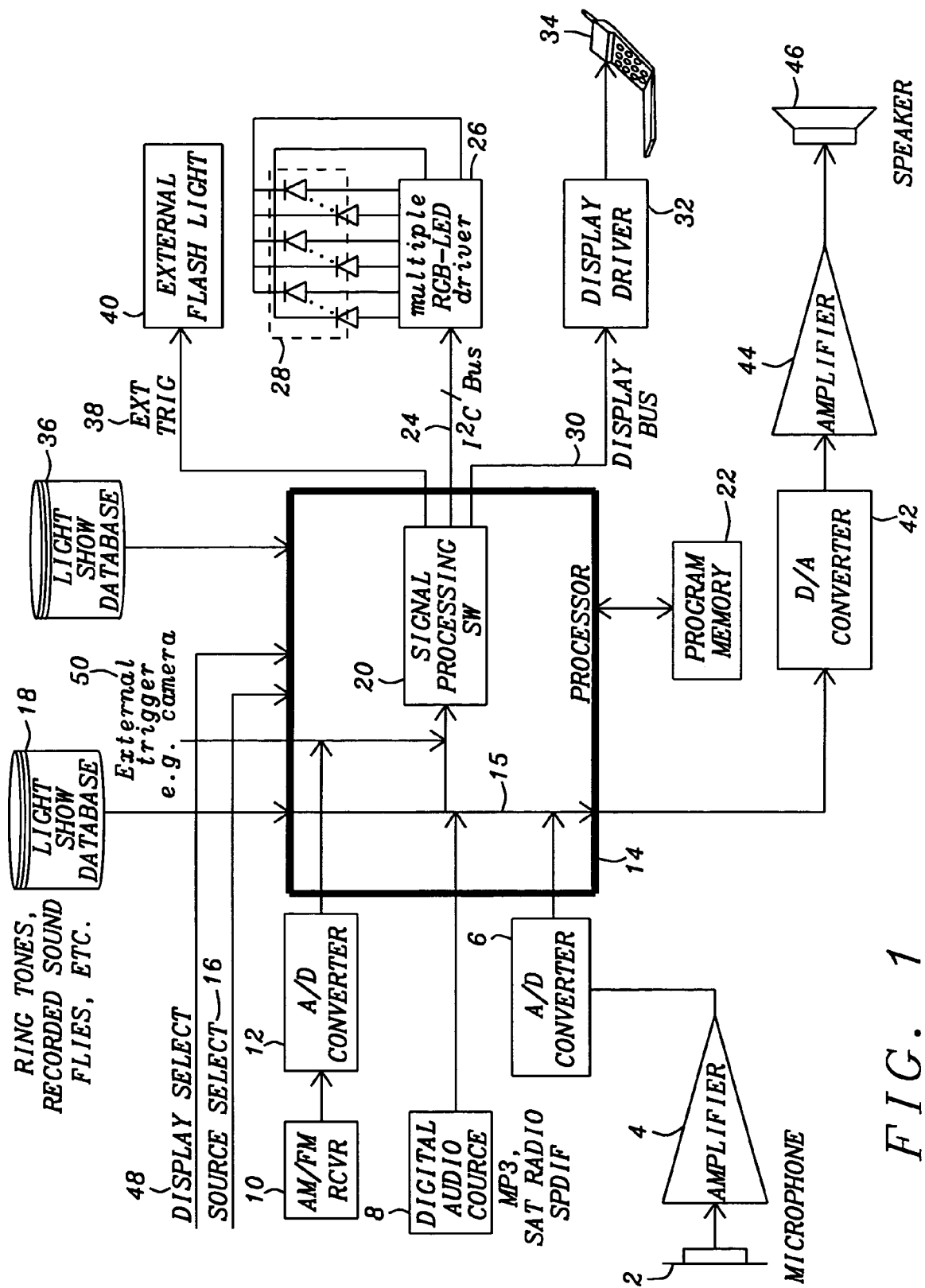
FIG. 1 is a block diagram of an audio to illumination conversion apparatus within a communication device of this invention.

Refer now to FIG. 1 for a more detailed discussion of the audio to illumination conversion apparatus within a communication device of this invention. A sound signal is applied to a microphone 2 to create an audio signal that is then applied to the amplifier 4 and from the amplifier to the analog to digital converter 6. The digitized audio signal from the analog to digital converter 6 is applied to the digital audio signal bus 15 as the one of the audio signals applied to the processor for conversion to a light signal. A second audio source may be a digital audio source 8 in which sound signals have been digitized and recorded. The digitized audio signal may be a MP3 music files, digital satellite radio signals, or Sony/Philips Digital Interface (SPDIF) signals to transfer digitized audio signals from a compact disk. The digitized audio signal source 8 is connected to the digitized audio signal bus 15 for transfer of the digitized audio signal. Alternately, an audio signal may originate from an AM/FM receiver 10 incorporated in the communication device of this invention. The output analog audio signal of the AM/FM receiver 10 is transferred to a second analog to digital converter 12 to convert the analog audio signal to a digitized audio signal that is communicated to the processor 14 through the digitized audio signal bus 15. Another source of the digitized audio signals is a sound database 18 in communication with the processor 14 through the digitized audio signal bus 15. The sound database 18 contains digitized audio files for ring tones and various recorded sound files.

The processor 14 executes a signal processing program 20 that performs a method for filtering the audio signals to create a number of pass bands of the audio signals. The method then integrates the non-filtered and filtered audio signals to determine the energy content and mean loudness of the audio signals. The energy content and the mean loudness are then used to determine the brightness, color, duration, and frequency of the illumination. The details of this program process will be discussed in more detail hereinafter.

The output light signals describing the brightness, color, duration, and frequency of the illumination are converted to interface levels such as the $I^2C$ (Inter-Integrated Circuits) bus 24 for transmission to a display driver 26. In the example, the display driver 26 is a circuit that provides the appropriate signal levels to the red, green, and/or blue LED's 28. In the communication device of the invention, these red, green, and/or blue LED's 28 are either arranged as cover lights or the backlights of a matrix display 34. Alternately, the output light signals may be arranged as the interface levels and coding for the display bus 30 to drive display driver 32 which in turn drives the matrix display 34. Additionally, the output light signals may be applied as an external trigger bus 38 to activate an external flashlight 40.

The matrix display 34 may be a cathode ray tube, a liquid crystal display, plasma display, or similar matrix display device. The external flashlight 40 may include red, green, and/or blue LED's, an incandescent light, a fluorescent light, an electroluminescent light, or a matrix image display element.

The signal processing program process 20 determines the patterns of the brightness, color, duration, and frequency of the illumination from the mean loudness, and energy content of the audio signal as predefined and retained in a light show database 36. The patterns of the brightness, color, duration, and frequency of the illumination retained light show database 36 may be a fixed set of algorithms with programmable parameters. Alternately, the light show may be customized employing programming languages such as Java. In case of lightshow customization, it can be done by the user or via downloads from service providers (comparable to the ring tone downloads).

The signal processing program process 20 receives a source select signal 16 and a display select signal 48. The source select signal 16 determines which audio source is to provide the audio signal that is to be converted to the illumination patterns. The display select signal 48 determines which display (red, green, and/or blue LED's 28, matrix display 34, external flashlight 40) is chosen to display the illumination patterns based on the audio signal.

The signal processing program process 20 is retained as an executable program in a retention media such as a program memory 22. In communication devices such as a cellular or wireless telephone, the program memory retention media 22 is a programmable read only memory (PROM), an erasable PROM, an electrically alterable PROM (EAPROM), a Flash random access memory (RAM), or static RAM. Alternately, the communication device may include other program data devices such as magnetic data disks and still be in keeping with this invention.

Upon selection of the audio source, the processor 14 may optionally transfer the digitized audio signal to a digital to analog converter 42 and from the digital to analog converter 42 to an amplifier 44. The amplified analog audio signal is then transferred to a speaker 46 for reproduction of the sound source.

Figure 2:
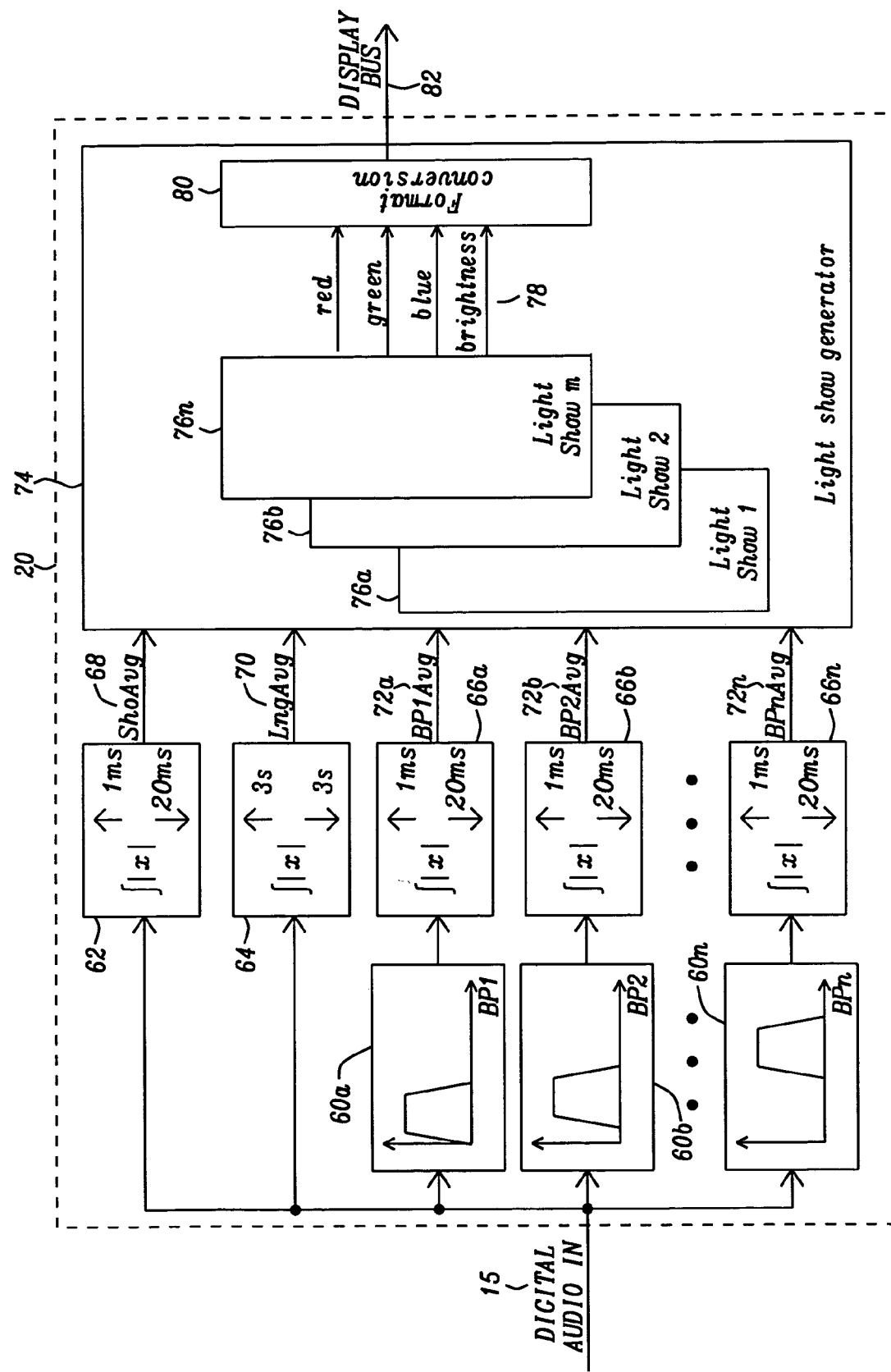
FIG. 2 is a schematic diagram of multiple filter circuits and the modulation generator of the audio to illumination conversion apparatus within the communication device of this invention.

A functional block diagram of the signal processing program process 20 is shown in FIG. 2. The digitized audio signal 15 is applied to each of the filtering sub-programs 60a, 60b, . . . , 60n. The filtering sub-programs 60a, 60b, . . . , 60n act as band-pass filters to separate out a pass band of desired frequencies within the spectrum of the audio signal. The results or output of the filtering sub-programs 60a, 60b, . . . , 60n is applied to a series of integration sub-programs 66a, 66b, . . . , 66n. The integration sub-programs 66a, 66b, . . . , 66n act as integrator circuits that determine an energy content of the pass-band from each of the filtering sub-programs 60a, 60b, . . . , 60n. The short term integrating sub-program 62 and the long term integrating sub-program 64 provide an overall energy content measurement of the digitized audio signal. To be independent of the absolute energy, which represents the loudness of the sound as represented by the digitized audio signal, the relationship of the short term energy and the long term energy will be used to generate the light attributes. For short term energy the short term integrating sub-program 62 implements an integrator with an increasing time constant of 1 ms, which ensures fast attack times and a smooth decreasing time constant of 20 ms. For long term energy calculation the long term integrating sub-program 64 implements an integrator with an integration time is programmed to be 3 seconds. The long term energy value represents an average value, which floats with the mean loudness. If the relationship between short and long term energy is employed in the determination of the illumination, the lightshows can be generated nearly independent of the loudness of the sound files. This ensures that sounds with low energy result in acceptable light variations.

The energy content signals 72a, 72b, . . . , 72n from the integration sub-programs 66a, 66b, . . . , 66n, the short term energy content signal 68 from the short term integrating sub-program 62, and the long term mean loudness signal 70 from the long term integrating sub-program 64 are applied to the light show generator 74. The light show generator 74 retrieves the chosen light show 76a, 76b, . . . , 76n from the light show database 36 of FIG. 1 and based on the energy content signals 68, 70, and 72a, 72b, . . . , 72n generates the color, brightness, duration, and frequency signals 78 that determine the patterns of the illumination displayed.

The color, brightness, duration, and frequency signals 78 are transferred to a format converter 80 for translation to an appropriate format for transmission to the display bus 82. The display bus 82 is the I²C bus 24, the display bus 30, or the external flashlight 40 of FIG. 1.

Figure 3:
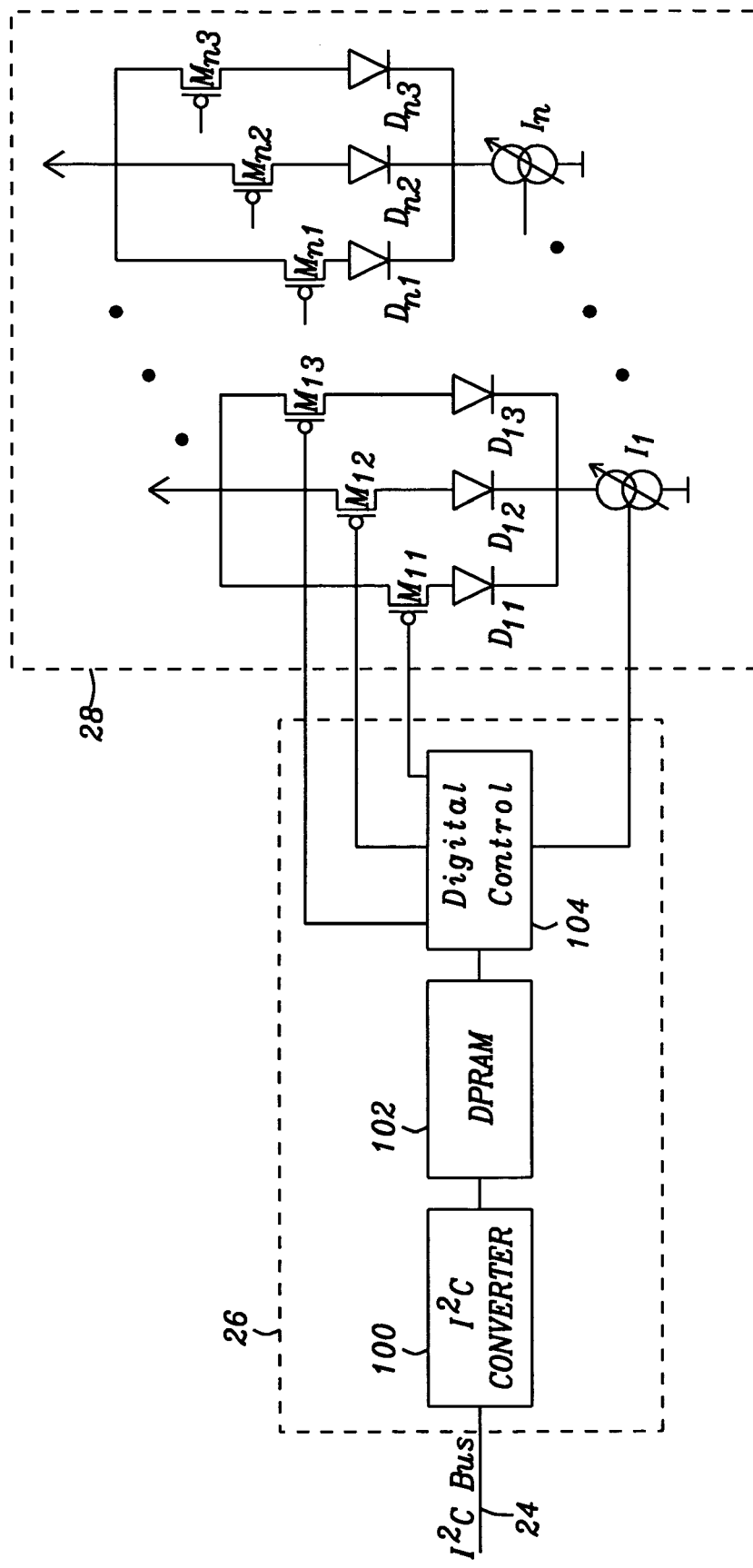
FIG. 3 system menus during the programming of the communication device is a schematic diagram for an example of an illumination device of the communication device of this invention.

FIG. 3 is an example of the illumination device of the communication device of this invention. The I²C bus 24 transfers the formatted color, brightness, duration, and frequency signals to the I²C converter 100 which re-converts the color, brightness, duration, and frequency signals from the I²C format. The re-converted color, brightness, duration, and frequency signals are transferred to and retained by the display program random access memory (DPRAM) 102. The DPRAM 192 is connected to the digital control circuit which provides the appropriate drive signals and levels to activate the red, green, and/or blue LED's 28. The transistors $M_{11}$, $M_{12}$, $M_{13}$, . . . , $M_{n1}$, $M_{n2}$, $M_{n3}$ act as switches to turn-on the red, green, and/or blue LED's $D_{11}$, $D_{12}$, $D_{13}$, . . . , $D_{n1}$, $D_{n2}$, $D_{n3}$. The variable current sources $I_1$, . . . , $I_2$ set to determine the brightness of the red, green, and/or blue LED's $D_{11}$, $D_{12}$, $D_{13}$, . . . , $D_{n1}$, $D_{n2}$, $Dn_3$.

The patterns of the light shows 76a, 76b, . . . , 76n (FIG. 2) as retained in the lightshow database 36 of (FIG. 1) are illustrated as the following:

1. A Mono Clavilux (7 colors) light show represents a brightness modulation of all connected LED's in single color. The modulation is based on the beat of the sound and the color of the LED's will be changed after an adjustable time frame. A seven color effects (red, green, yellow, blue, magenta, cyan and white) is shown.
2. A rotating VU (volume unit) meter provides a display of the average loudness of the sound from the audio source. Three green LED's which indicate low levels. Two yellow LED's indicate a medium level and a single red LED indicates a maximum peak level. If the placement of the LED's is in a circle on the cover of the communication devices, the VU meter rotates anti clockwise with the detection of a total peak duration more than a programmable time. All LED's will have the same maximum brightness.
3. A flashlight provides a stroboscope effect. All the LED's will flash on maximum brightness in white color based on medium beat levels.
4. A rotating color light show has six colors (red, green, yellow, blue, magenta and cyan) rotating an ordered fashion based on higher frequency (1500–3000 Hz) beats based on a rhythm of music or sound input. All LED's are programmed in maximum brightness.
5. A Multi Clavilux light show is derived from a frequency analysis of the audio signal. The level of each frequency band modulates the brightness of an appropriate LED. This light show includes six frequency filters. The six filters respectively have a center frequency of 100 Hz, 300 Hz, 500 Hz, 1 kHz, 2 kHz and 4 kHz implemented. If a slower clock rate of 8 kHz is implemented then the center frequencies are 100 Hz, 300 Hz, 500 Hz, 800 Hz, 1.2 kHz and 2 kHz.
6. A frequency selective color switching light show has a new color generated as soon as the level in a frequency band exceeds a threshold. The LED's are programmed in maximum brightness
7. A frequency selective colors and brightness light show modulates the color and the brightness of each LED. The modulation is based on the level of each frequency band.
8. A "snake" light show has the active mono colored LED's rotating. After a full rotation, the number of active LED's will be increased by one. When all LED's are active, the color will be changed and the show restarts with the next color. The color sequence is (red, green, yellow, blue, magenta, cyan and white).
9. A logical combination light show has the high frequency beat controlling the colors of the different LED's. The colors will be derived from a single counter or some logical combination of it. The brightness of the LED's is set to a maximum.

10. A selective color meter is based on the level in each frequency band, the color will be changed. The colors in increasing level order are white, cyan, magenta, yellow, blue, green and red.

As stated above, the light show may be customized employing programming languages such as Java. In case of lightshow customization, it can be done by the user or via downloads from service providers (comparable to the ring tone downloads).

Figure 4:
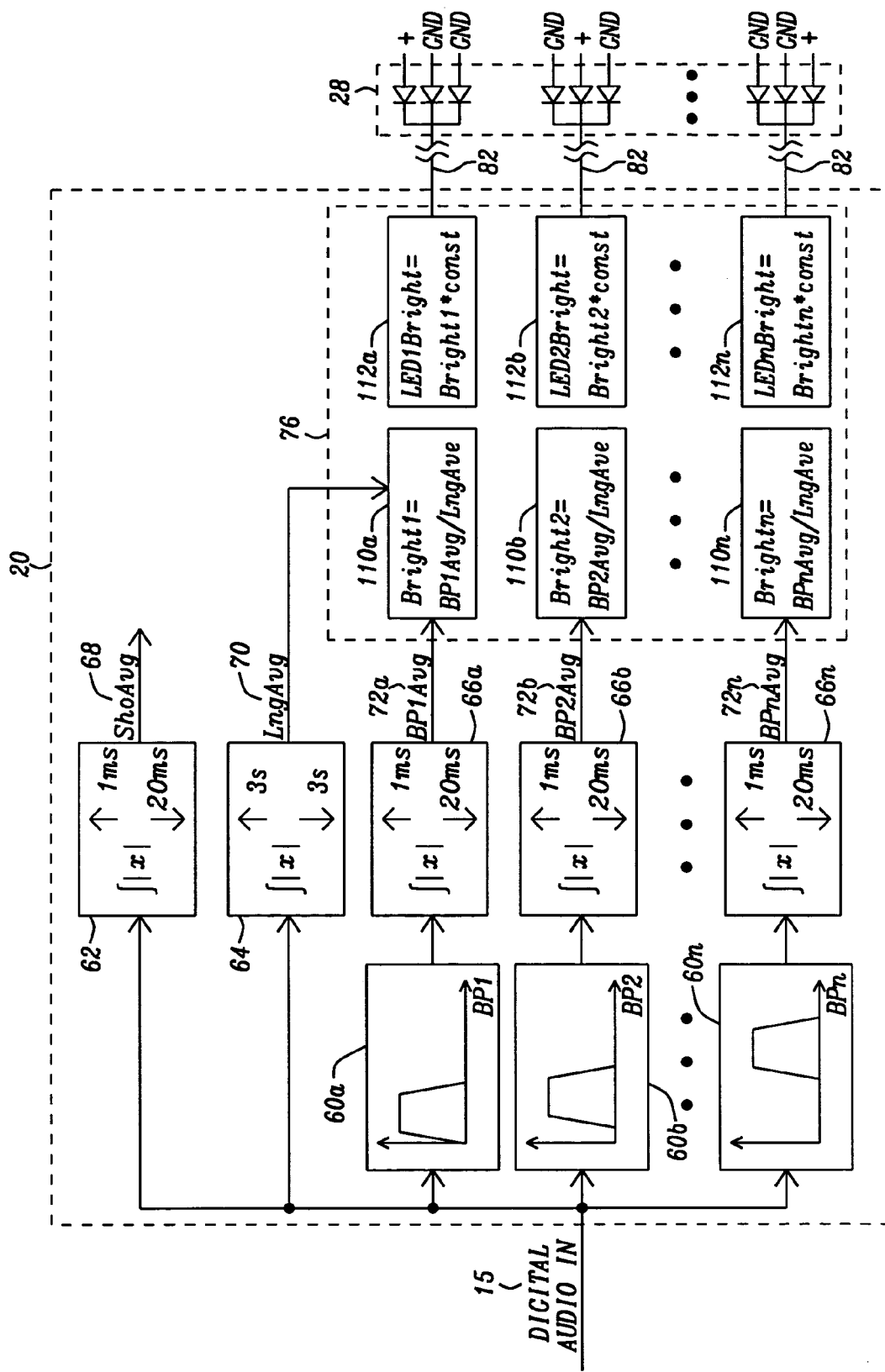
FIG. 4 is a schematic diagram of a preferred embodiment of the audio to illumination apparatus of the communication device of this invention.

Refer now to FIG. 4 for an illustration for generation of a light show pattern. The audio signal 15 is applied to the signal processing program process 20 to be filtered and integrated as described in FIG. 3. In the light show procedure 76 the energy content signals 68, 70, and 72a, 72b, . . . , 72n employed to determine the brightness of selected LED's 28. In this example the brightness of the LED chosen is dependent on the energy content of the pass band of associated filters and is determined by the program process 110a, 110b, . . . , 110n according to the equation:

$$Bright \times = BP \times AVG/LngAve$$

where:

Bright× is the brightness of the LED associated with a band-pass filter.

BP×AVG is the energy content or loudness of the audio signal in the associated pass band.

LngAve is the mean loudness or average energy of the audio signal.

The LED brightness (LED×Bright) is corrected by the program process 112a, 112b, . . . , 112n to provide a correct level based on a multiplication by a constant (const). The filtered audio signals and integrator values are calculated on a sample per sample basis, whereas the following calculation for the brightness including division and correction (multiplication with a constant) will be done every 100 ms. The output of the correction process provides the color, brightness, duration, and frequency signals that are transferred to format converter and then to the display bus 82 as described above. The LED's of the red, green, and/or blue LED's 28 are activated as appropriate.

Figure 5:
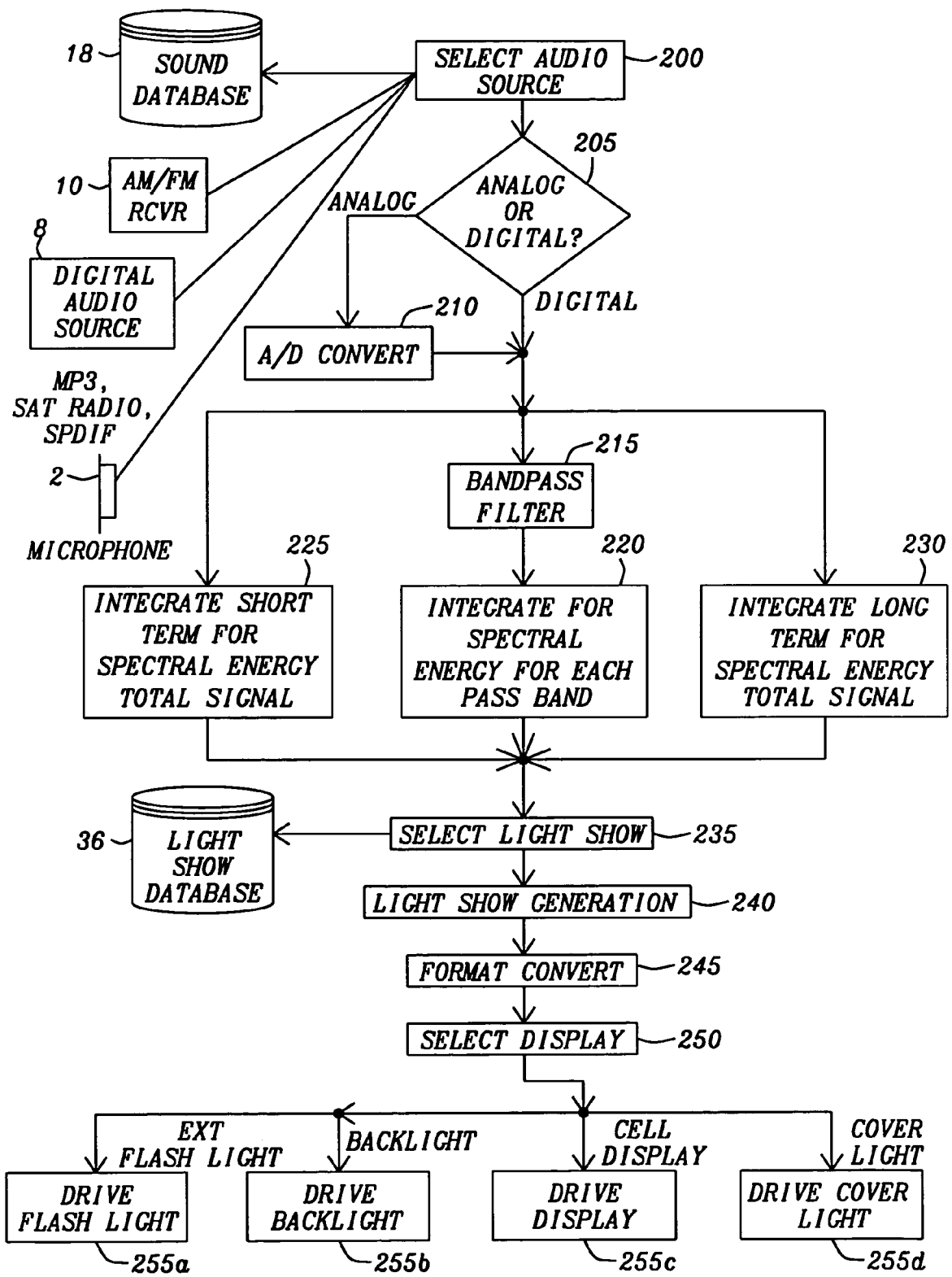
FIG. 5 is flow chart of the method for the audio to illumination conversion of this invention.

The communication device shown in FIG. 1, in the preferred embodiment includes a signal processor for performing a method for sound to illumination conversion as shown in FIG. 5. The method begins with the selection (Box 200) of an audio source. The candidate audio sources for selection (Box 200) are the built in microphone 2 of the communication device, a digital audio source 8 such as a satellite radio or MP3 file, an AM/FM radio receiver 10, or a sound database 18 containing recorded sound files used for ring tones of the cellular phone. The audio source is selected (Box 200) in one of the system menus during the programming of the communication device.

The source is examined (Box 205) to determine if it is an analog or digital audio signal. If it is an analog audio signal, it converted (Box 210) to a digital audio signal. The digital audio signal is then band-pass filtered (Box 215) to separate out multiple pass bands of desired frequencies within the spectrum of the audio signal. Each of the filtered audio signals is then integrated (Box 220) to determine the energy content of each of the pass-bands of the filtered audio signal.

Coincident with the pass-band filtering (Box 212) and integration (Box 220), the audio signal is integrated for a short term (Box 225) and is integrated for a long term (Box 230) to provide an overall measurement of the digitized audio signal. To be independent of the absolute energy, which represents the loudness of the sound as represented by the digitized audio signal, the relationship of the short term energy and the long term energy will be used to generate the light attributes. For short term energy calculation, the short term integration (Box 225) implements an integrator with an increasing time constant of 1 ms, which ensures fast attack times and a smooth decreasing time constant of 20 ms. For long term energy calculation, the long term integration (Box 230) implements an integrator with an integration time is programmed to be 3 seconds. The long term energy value represents an average value, which floats with the mean loudness. If the relationship between short and long term energy is employed in the determination of the illumination, the lightshows can be generated nearly independent of the loudness of the sound files. This ensures that sounds with low energy result in acceptable light variations.

The patterns of the brightness, color, duration, and frequency of the illumination are determined from the mean loudness, and energy content of the audio signal as predefined and retained in a light show database 36. The patterns of the brightness, color, duration, and frequency of the illumination retained light show database 36 may be a fixed set of algorithms with programmable parameters. Alternately, the light show may be customized employing programming languages such as Java. In case of lightshow customization, it can be done by the user or via downloads from service providers (comparable to the ring tone downloads). The light show is selected (Box 235) from system menus and associated with an audio source during the programming of the communication device.

The energy content information derived from the integration (Box 220), the short term energy content signal from the short term integration (Box 225), and the long term mean loudness signal from the long term integration (Box 230) are then applied to the selected light show to generate (Box 240) the color, brightness, duration, and frequency that determine the patterns of the illumination displayed.

The color, brightness, duration, and frequency are then converted (Box 245) to translate the color, brightness, duration, and frequency patterns to an appropriate format for transmission to a display. The format complies with the I²C specification, the specification of the matrix display, or that of a trigger for the external flashlight 40 of FIG. 1. The device that is to display the light show patterns is selected (Box 250). The display to be selected (Box 250) are the red, green, and/or blue LED's of the cover light or backlight of the matrix display, matrix display itself, or an external flashlight. The chosen display (cover light or backlight of the matrix display, matrix display itself, or an external flashlight) is then driven (Boxes 255a, 255b, 255c, or 255d) to produce the conversion of the audio signals to an illumination pattern. The illumination patterns follow the descriptions above of the light shows as retained in the light show database 36.

While this invention has been particularly shown and described with reference to the preferred embodiments thereof, it will be understood by those skilled in the art that various changes in form and details may be made without departing from the spirit and scope of the invention.

The invention claimed is:

1. An audio to illumination conversion system for modulating an illumination device in response to an audio signal, comprising:
    a plurality of audio input sources, each audio input source receiving a sound and converting said sound to said audio signal;

a plurality of audio filter circuits, each audio filter circuit in communication with said audio input sources to receive said audio signal and filter said audio signal to restrict frequency content of said audio signal to a pass-band of each of the plurality of said audio filter circuit;

a plurality of integration circuits, each integration circuit in communication with one of the plurality of audio filter circuits to generate an energy content signal indicating a first energy level within said pass-band of the audio signal; and an illumination modulator in communication with the plurality of integration circuits to generate a modulation pattern for said illumination device in response to the energy content signals of said plurality of integration circuits.

2. The audio to illumination conversion system of claim 1 further comprising a short term integration circuit in communication with said plurality of audio input sources to generate a short term energy content signal indicating a second energy level of said audio signal over a whole spectrum of said audio signal.

3. The audio to illumination conversion system of claim 2 wherein said illumination modulator is in communication with said short term integration circuit to further generate said modulation pattern for said illumination device in response to the short term energy content signal.

4. The audio to illumination conversion system of claim 3 further comprising a long term integration circuit in communication with said plurality of audio input sources to generate a long term energy content signal indicating a mean loudness of said audio signal over a whole spectrum of said audio signal.

5. The audio to illumination conversion system of claim 4 wherein said illumination modulator is in communication with said long term integration circuit to further generate said modulation pattern for said illumination device in response to the long term energy content signal.

6. The audio to illumination conversion system of claim 5 wherein a relationship of said short term energy content signal and said long term energy content signal ensure that sound signals with low energy content provide modulate said illumination device with acceptable light variations.

7. The audio to illumination conversion system of claim 1 further comprising an illumination device control circuit in communication with said illumination modulator to receive said modulation pattern to generate illumination device control signals to control color and brightness of said illumination device.

8. The audio to illumination conversion system of claim 7 wherein said illumination device is a plurality of light-emitting diodes, a liquid crystal display backlight, an incandescent light, a fluorescent light, an electroluminescent light, or an image display element.

9. The audio to illumination conversion system of claim 8 wherein the image display element is a cathode ray tube, a liquid crystal display, or plasma display.

10. The audio to illumination conversion system of claim 1 wherein the audio source are chosen from a group of audio sources consisting of a microphone, an RF receiver, or a digital audio source.

11. The audio to illumination conversion system of claim 1 wherein the audio source is a sound database containing communication ring tones or recorded sound files.

12. The audio to illumination conversion system of claim 1 wherein the audio source includes an analog to digital converter to sample electrical signals generated by a transducer receiving said sound and convert said sample to a digital coding representing said sample of said electrical signals.

13. A communication device comprising
an illumination device for providing lighting of said communication device;
a plurality of audio input sources, each audio input source receiving a sound and converting said sound to said audio signal; and
an audio to illumination conversion apparatus for modulating said illumination device in response to an audio signal, comprising:
a plurality of audio filter circuits, each audio filter circuit in communication with said audio input sources to receive said audio signal and filter said audio signal to restrict frequency content of said audio signal to a pass-band of each of the plurality of said audio filter circuit;
a plurality of integration circuits, each integration circuit in communication with one of the plurality of audio filter circuits to generate an energy content signal indicating a first energy level within said pass-band of the audio signal; and
an illumination modulator in communication with the plurality of integration circuits to generate a modulation pattern for said illumination device in response to the energy content signals of said plurality of integration circuits.

14. The communication device of claim 13 wherein said audio to illumination conversion apparatus further comprises a short term integration circuit in communication with said plurality of audio input sources to generate a short term energy content signal indicating a second energy level of said audio signal over a whole spectrum of said audio signal.

15. The communication device of claim 14 wherein said illumination modulator is in communication with said short term integration circuit to further generate said modulation pattern for said illumination device in response to the short term energy content signal.

16. The communication device of claim 15 wherein said audio to illumination conversion apparatus further comprises a long term integration circuit in communication with said plurality of audio input sources to generate a long term energy content signal indicating a mean loudness of said audio signal over a whole spectrum of said audio signal.

17. The communication device of claim 16 wherein said illumination modulator is in communication with said long term integration circuit to further generate said modulation pattern for said illumination device in response to the long term energy content signal.

18. The communication device of claim 17 wherein a relationship of said short term energy content signal and said long term energy content signal ensure that sound signals with low energy content provide modulate said illumination device with acceptable light variations.

19. The communication device of claim 13 wherein said audio to illumination conversion apparatus further comprises an illumination device control circuit in communication with said illumination modulator to receive said modulation pattern to generate illumination device control signals to control color and brightness of said illumination device.

20. The communication device of claim 19 wherein said illumination device is a plurality of light-emitting diodes, a liquid crystal display backlight, an incandescent light, a fluorescent light, an electroluminescent light, or an image display element.

21. The communication device of claim 20 wherein the image display element is a cathode ray tube, a liquid crystal display, or plasma display.

22. The communication device of claim 13 wherein the audio source are chosen from a group of audio sources consisting of a microphone, an RF receiver, or a digital audio source.

23. The communication device of claim 13 wherein the audio source is a sound database containing communication ring tones or recorded sound files.

24. The communication device of claim 13 wherein the audio source includes an analog to digital converter to sample electrical signals generated by a transducer receiving said sound and convert said sample to a digital coding representing said sample of said electrical signals.

25. The communication device of claim 13 wherein said communication device is a cellular telephone handset, a cordless telephone handset, or a personal digital assistant capable of communicating with a telephone network.

26. An audio responsive lighting display comprising
    an illumination device for providing illumination of said audio responsive lighting display;
    a plurality of audio input sources, each audio input source receiving a sound and converting said sound to said audio signal; and
    an audio to illumination conversion apparatus in communication with said plurality of audio input sources and said illumination device for modulating said illumination device in response to said audio signal, comprising:
        a plurality of audio filter circuits, each audio filter circuit in communication with said audio input sources to receive said audio signal and filter said audio signal to restrict frequency content of said audio signal to a pass-band of each of the plurality of said audio filter circuit;
        a plurality of integration circuits, each integration circuit in communication with one of the plurality of audio filter circuits to generate an energy content signal indicating a first energy level within said passband of the audio signal; and
        an illumination modulator in communication with the plurality of integration circuits to generate a modulation pattern for said illumination device in response to the energy content signals of said plurality of integration circuits.

27. The audio responsive lighting display of claim 26 wherein said audio to illumination conversion apparatus further comprises a short term integration circuit in communication with said plurality of audio input sources to generate a short term energy content signal indicating a second energy level of said audio signal over a whole spectrum of said audio signal.

28. The audio responsive lighting display of claim 27 wherein said illumination modulator is in communication with said short term integration circuit to further generate said modulation pattern for said illumination device in response to the short term energy content signal.

29. The audio responsive lighting display of claim 28 wherein said audio to illumination conversion apparatus further comprises a long term integration circuit in communication with said plurality of audio input sources to generate a long term energy content signal indicating a mean loudness of said audio signal over a whole spectrum of said audio signal.

30. The audio responsive lighting display of claim 29 wherein said illumination modulator is in communication with said long term integration circuit to further generate said modulation pattern for said illumination device in response to the long term energy content signal.

31. The audio responsive lighting display of claim 30 wherein a relationship of said short term energy content signal and said long term energy content signal ensure that sound signals with low energy content provide modulate said illumination device with acceptable light variations.

32. The audio responsive lighting display of claim 26 wherein said audio to illumination conversion apparatus further comprises an illumination device control circuit in communication with said illumination modulator to receive said modulation pattern to generate illumination device control signals to control color and brightness of said illumination device.

33. The audio responsive lighting display of claim 32 wherein said illumination device is a plurality of light-emitting diodes, a liquid crystal display backlight, an incandescent light, a fluorescent light, an electroluminescent light, or an image display element.

34. The audio responsive lighting display of claim 33 wherein the image display element is a cathode ray tube, a liquid crystal display, or plasma display.

35. The audio responsive lighting display of claim 26 wherein the audio source are chosen from a group of audio sources consisting of a microphone, an RF receiver, or a digital audio source.

36. The audio responsive lighting display of claim 26 wherein the audio source is a sound database containing telephonic ring tones or recorded sound files.

37. The audio responsive lighting display of claim 26 wherein the audio source includes an analog to digital converter to sample electrical signals generated by a transducer receiving said sound and convert said sample to a digital coding representing said sample of said electrical signals.

38. A method for modulating an illumination device in response to an audio signal, comprising the steps of:
    selecting one of a plurality of audio input sources to provide an audio signal;
    filtering said audio signal to restrict frequency content of said audio signal to at least one pass-band;
    integrating said pass-bands of said audio signal to generate an energy content signal indicating a first energy level within said pass-bands of the audio signal; and
    generating a modulation pattern for said illumination device in response to the energy content signals of said pass-bands.

39. The method of claim 38 further comprising the step of integrating over a short term audio signal to generate a short term energy content signal indicating a second energy level of said audio signal over a whole spectrum of said audio signal.

40. The method of claim 39 further comprising the step of generating said modulation pattern for said illumination device in response to the short term energy content signal.

41. The method of claim 40 further comprising the step of integrating over a long term said audio signal to generate a long term energy content signal indicating a mean loudness of said audio signal over a whole spectrum of said audio signal.

42. The method of claim 41 further comprising the step of generating said modulation pattern for said illumination device in response to the long term energy content signal.

43. The method of claim 42 wherein a relationship of said short term energy content signal and said long term energy content signal ensure that sound signals with low energy content provide modulate said illumination device with acceptable light variations.

44. The method of claim 38 further comprising the step of controlling said illumination device to generate illumination device control signals to control color and brightness of said illumination device in response to said modulation pattern.

45. The method of claim 44 wherein said illumination device is a plurality of light-emitting diodes, a liquid crystal display backlight, an incandescent light, a fluorescent light, an electroluminescent light, or an image display element.

46. The method of claim 45 wherein the image display element is a cathode ray tube, a liquid crystal display, or plasma display.

47. The method of claim 38 wherein the audio source is chosen from a group of audio sources consisting of a microphone, an RF receiver, or a digital audio source.

48. The method of claim 38 wherein the audio source is a sound database containing communication ring tones or recorded sound files.

49. The method of claim 38 wherein the audio source includes an analog to digital converter to sample electrical signals generated by a transducer receiving said sound and convert said sample to a digital coding representing said sample of said electrical signals.

50. An apparatus for modulating an illumination device in response to an audio signal, comprising:
    means for selecting one of a plurality of audio input sources to provide an audio signal;
    means for filtering said audio signal to restrict frequency content of said audio signal to at least one pass-band;
    means for integrating said pass-bands of said audio signal to generate an energy content signal indicating a first energy level within said pass-bands of the audio signal; and
    means for generating a modulation pattern for said illumination device in response to the energy content signals of said pass-bands.

51. The apparatus of claim 50 further comprising means for integrating over a short term audio signal to generate a short term energy content signal indicating a second energy level of said audio signal over a whole spectrum of said audio signal.

52. The apparatus of claim 51 further comprising means for generating said modulation pattern for said illumination device in response to the short term energy content signal.

53. The apparatus of claim 52 further comprising means for integrating over a long term said audio signal to generate a long term energy content signal indicating a mean loudness of said audio signal over a whole spectrum of said audio signal.

54. The apparatus of claim 53 further comprising means for generating said modulation pattern for said illumination device in response to the long term energy content signal.

55. The apparatus of claim 54 wherein a relationship of said short term energy content signal and said long term energy content signal ensure that sound signals with low energy content provide modulate said illumination device with acceptable light variations.

56. The apparatus of claim 50 further comprising means for controlling said illumination device to generate illumination device control signals to control color and brightness of said illumination device in response to said modulation pattern.

57. The apparatus of claim 56 wherein said illumination device is a plurality of light-emitting diodes, a liquid crystal display backlight, an incandescent light, a fluorescent light, an electroluminescent light, or an image display element.

58. The apparatus of claim 57 wherein the image display element is a cathode ray tube, a liquid crystal display, or plasma display.

59. The apparatus of claim 50 wherein the audio source is chosen from a group of audio sources consisting of a microphone, an RF receiver, or a digital audio source.

60. The apparatus of claim 50 wherein the audio source is a sound database containing communication ring tones or recorded sound files.

61. The apparatus of claim 50 wherein the audio source includes an analog to digital converter to sample electrical signals generated by a transducer receiving said sound and convert said sample to a digital coding representing said sample of said electrical signals.

62. A medium for retaining a computer program which, when executed on a computing system, performs a program process that modulates an illumination device in response to an audio signal, said program process comprising the steps of:
    selecting one of a plurality of audio input sources to provide an audio signal;
    filtering said audio signal to restrict frequency content of said audio signal to at least one pass-band;
    integrating said pass-bands of said audio signal to generate an energy content signal indicating a first energy level within said pass-bands of the audio signal; and
    generating a modulation pattern for said illumination device in response to the energy content signals of said pass-bands.

63. The medium for retaining a computer program of claim 62 wherein said program process further comprises the step of integrating over a short term audio signal to generate a short term energy content signal indicating a second energy level of said audio signal over a whole spectrum of said audio signal.

64. The medium for retaining a computer program of claim 63 wherein said program process further comprises the step of generating said modulation pattern for said illumination device in response to the short term energy content signal.

65. The medium for retaining a computer program of claim 64 wherein said program process further comprises the step of integrating over a long term said audio signal to generate a long term energy content signal indicating a mean loudness of said audio signal over a whole spectrum of said audio signal.

66. The medium for retaining a computer program of claim 65 wherein said program process further comprises the step of generating said modulation pattern for said illumination device in response to the long term energy content signal.

67. The medium for retaining a computer program of claim 66 wherein a relationship of said short term energy content signal and said long term energy content signal ensure that sound signals with low energy content provide modulate said illumination device with acceptable light variations.

68. The medium for retaining a computer program of claim 62 wherein said program process further comprises the step of controlling said illumination device to generate illumination device control signals to control color and brightness of said illumination device in response to said modulation pattern.

69. The medium for retaining a computer program of claim 68 wherein said illumination device is a plurality of light-emitting diodes, a liquid crystal display backlight, an incandescent light, a fluorescent light, an electroluminescent light, or an image display element.

70. The medium for retaining a computer program of claim 69 wherein the image display element is a cathode ray tube, a liquid crystal display, or plasma display.

71. The medium for retaining a computer program of claim 62 wherein the audio source is chosen from a group of audio sources consisting of a microphone, an RF receiver, or a digital audio source.

72. The medium for retaining a computer program of claim 62 wherein the audio source is a sound database containing communication ring tones or recorded sound files.

73. The medium for retaining a computer program of claim 62 wherein the audio source includes an analog to digital converter to sample electrical signals generated by a transducer receiving said sound and convert said sample to a digital coding representing said sample of said electrical signals.

* * * * *